United States Patent [19]

Filion

[11] Patent Number: 5,814,216
[45] Date of Patent: Sep. 29, 1998

[54] WASTE WATER CONTAMINANT SEGREGATING UNIT FOR SEWER CONDUITS

[75] Inventor: Gilles Filion, Kirkland, Canada

[73] Assignee: John Meunier Inc., Montreal, Canada

[21] Appl. No.: 797,223

[22] Filed: Feb. 7, 1997

[51] Int. Cl.$^6$ .............................. E03F 5/14; E03F 5/10; B01D 36/04

[52] U.S. Cl. ..................... 210/154; 210/156; 210/162; 210/242.1; 210/121; 210/355; 210/357; 210/304; 210/306

[58] Field of Search ..................... 210/304, 306, 210/121, 130, 355, 242.1, 357, 162, 154, 156

[56] References Cited

U.S. PATENT DOCUMENTS

| | | |
|---|---|---|
| 3,843,520 | 10/1974 | Bottorf . |
| 4,024,063 | 5/1977 | Youzi . |
| 5,531,888 | 7/1996 | Geiger . |
| 5,543,038 | 8/1996 | Johannessen . |

FOREIGN PATENT DOCUMENTS

| | | |
|---|---|---|
| 4125419 | 8/1992 | Germany . |
| 4139572 | 3/1993 | Germany . |

*Primary Examiner*—Thomas M. Lithgow
*Attorney, Agent, or Firm*—François Martineau

[57] ABSTRACT

The screening apparatus of the invention has a main cylindrical chamber linking a waste water inlet pipe to a refuse pipe and to an overflow outlet pipe. The waste water inlet pipe conveys water from a city sewer duct or the like, and this water is destined to be conveyed to a water treatment plant through the refuse pipe. However, during important storm water flow rate conditions in the waste water inlet pipe, the water level in the main chamber will rise since the refuse pipe will overflow due to a too large quantity of water. The screening apparatus includes a coaxial, cylindrical rotor defining a vertical through channel, and an annular grate being located intermediate the top and bottom of the main chamber and extending from the bottom edge of the rotor radially outwardly to the peripheral wall of the main chamber, where the annular grate is fixedly anchored. The rotor carries brooms adjacent the grate underface. Thus, when the water level rises, it passes through the grate to be effectively screened before it reaches the overflow pipe outlet, to be returned into the environment. The rotor can rotate under the power of the water flow, by means of downwardly projecting blades, so that the brooms will rotate to sweep the whole grate underface and help prevent clogging of the grate by macroparticles. The waste water pipe is connected to the main chamber in an eccentrical fashion, so as to create a water vortex when the water flows into the main chamber.

20 Claims, 11 Drawing Sheets

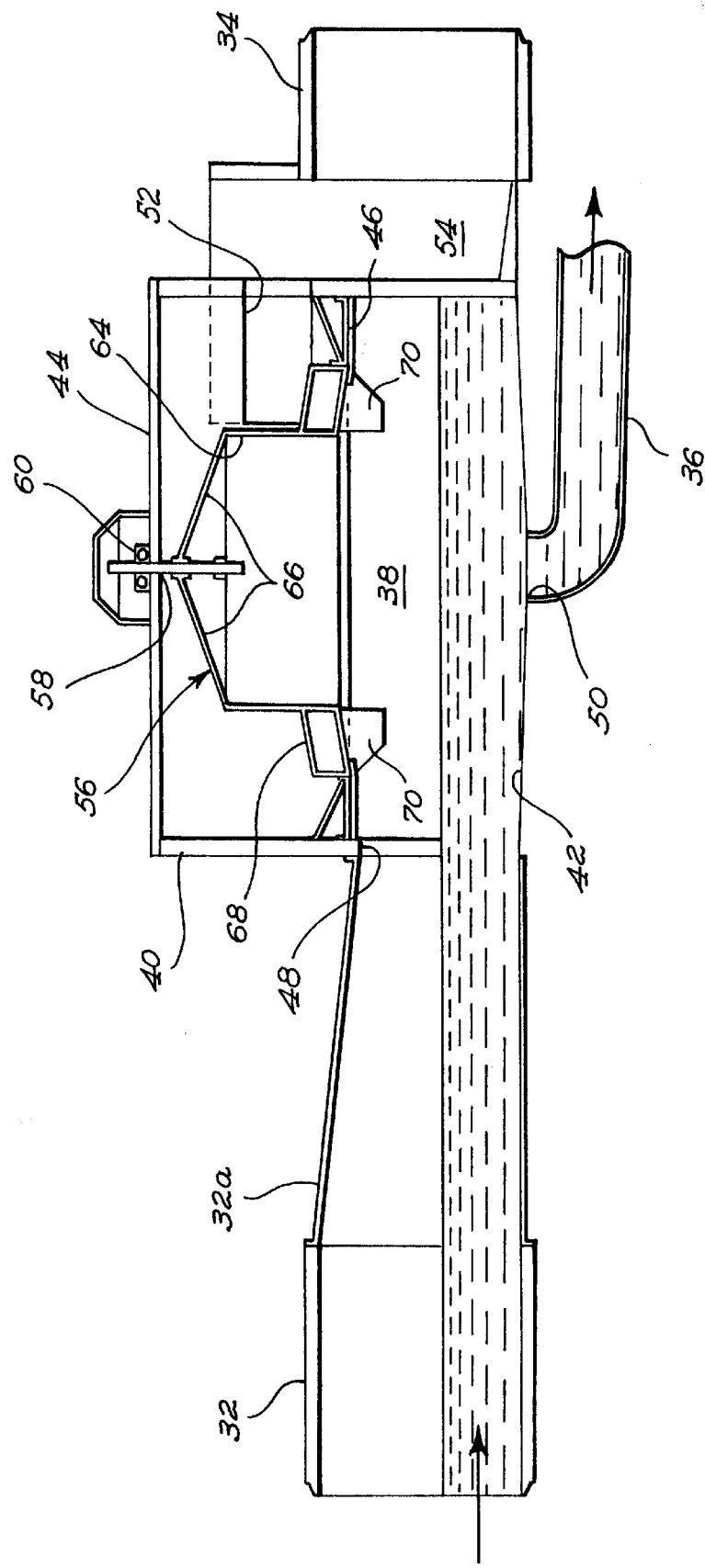

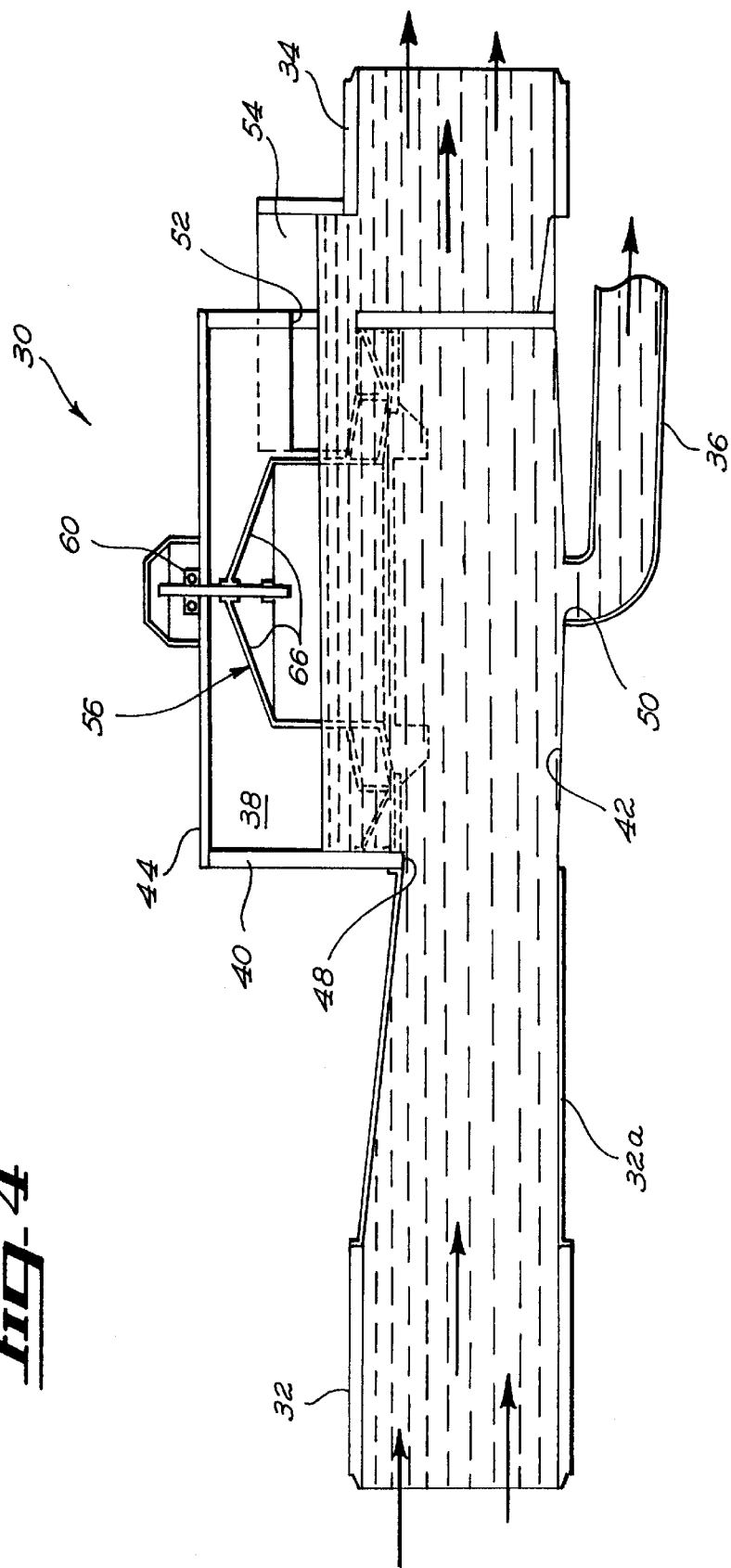

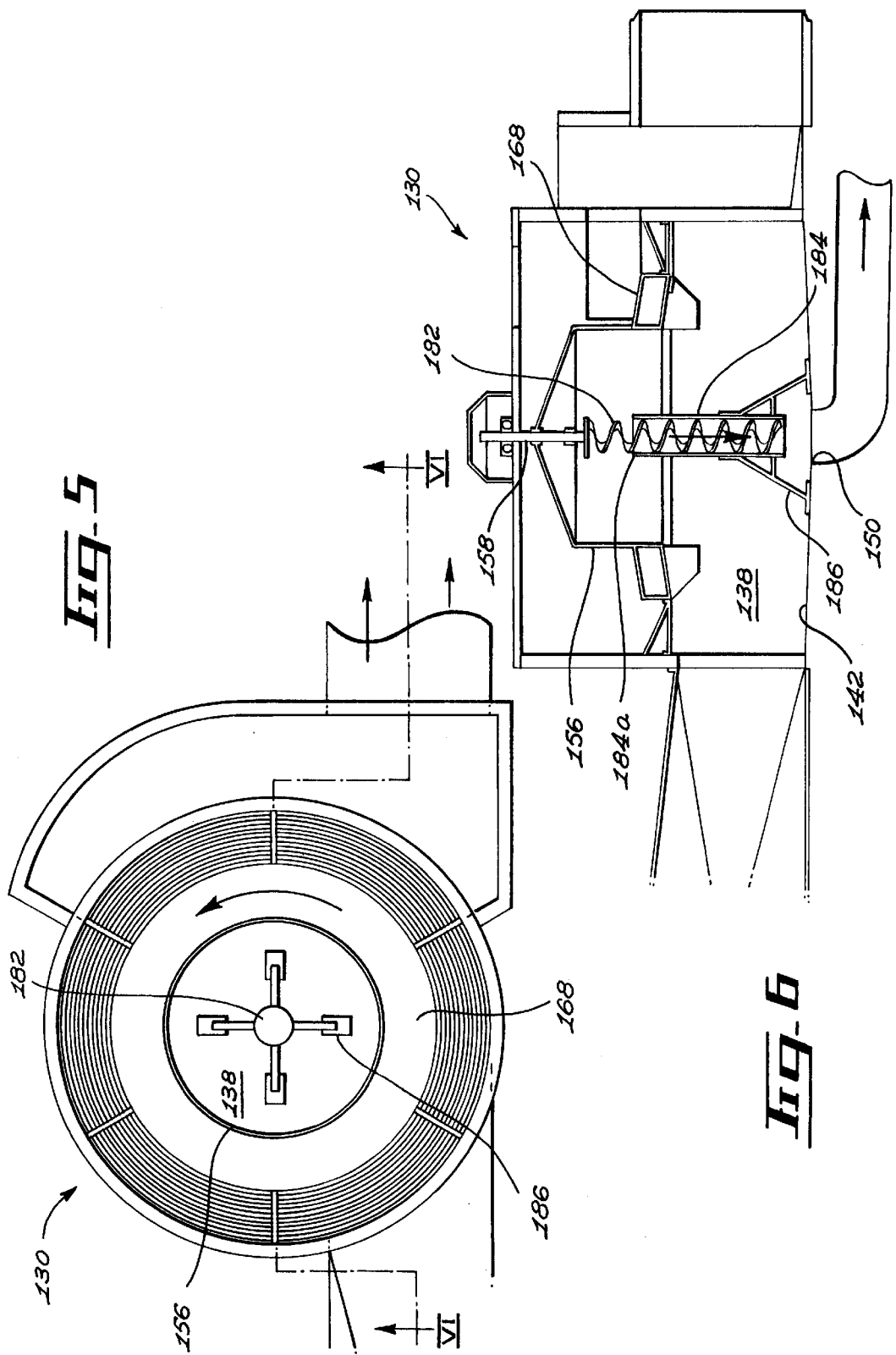

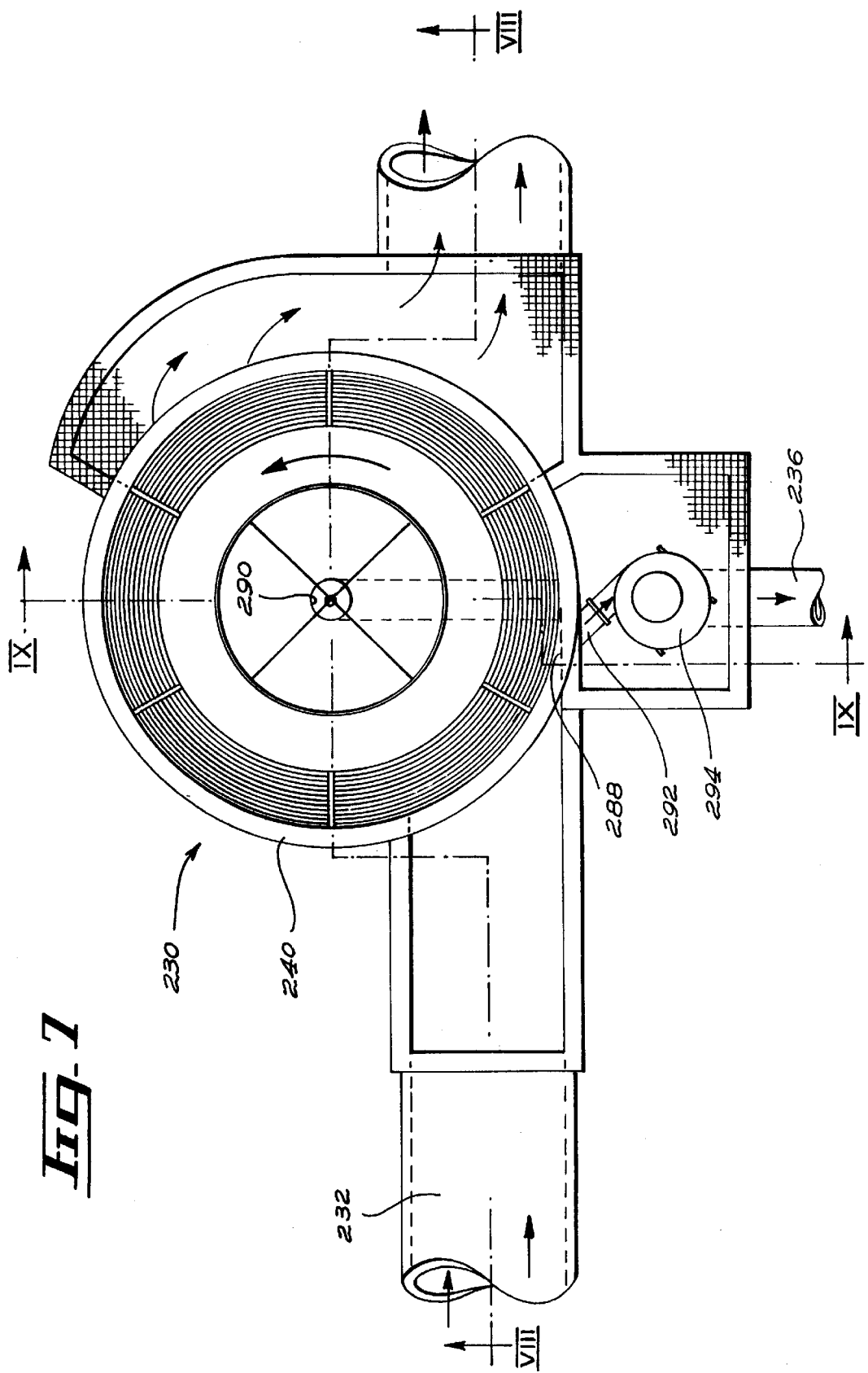

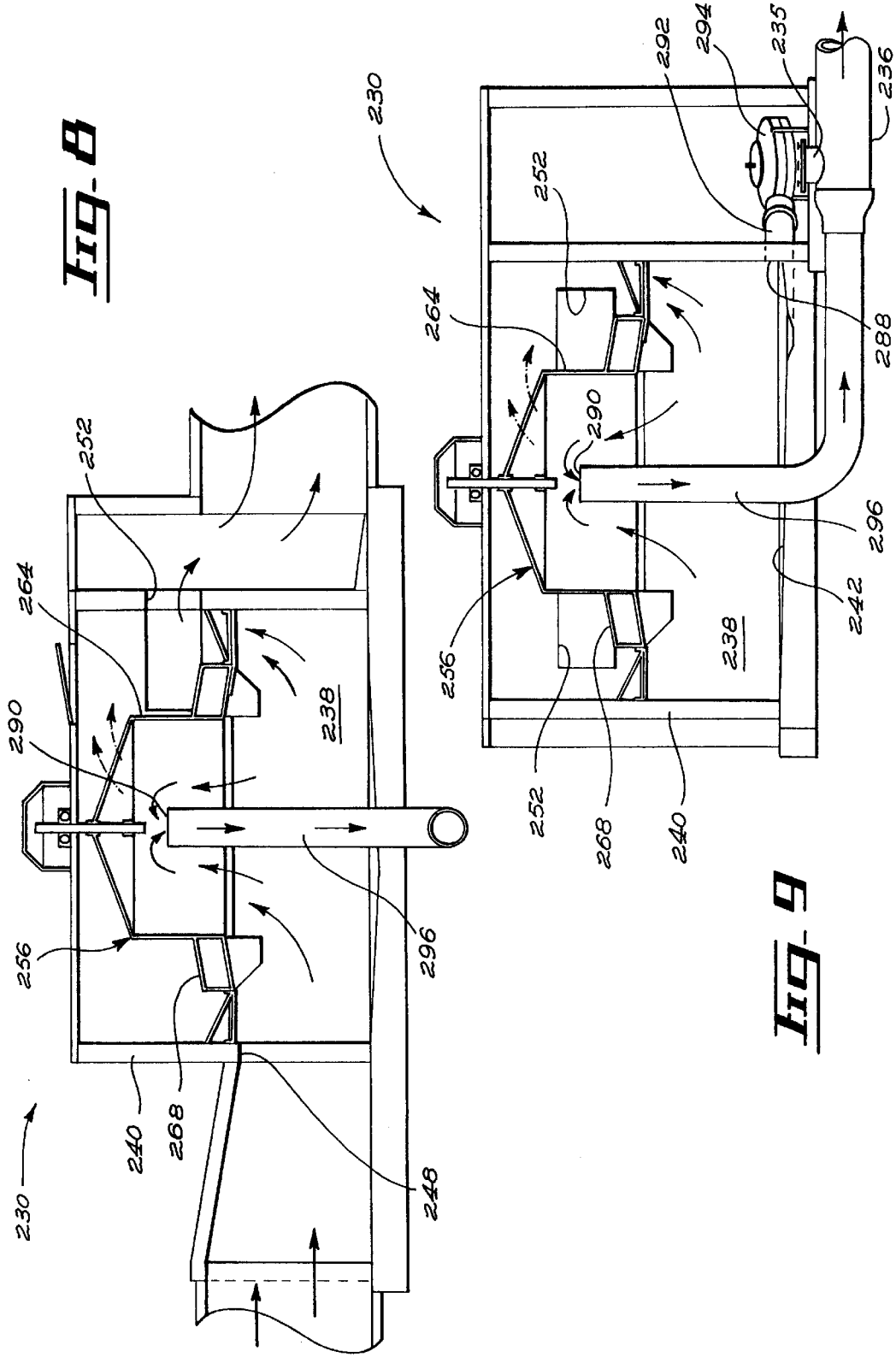

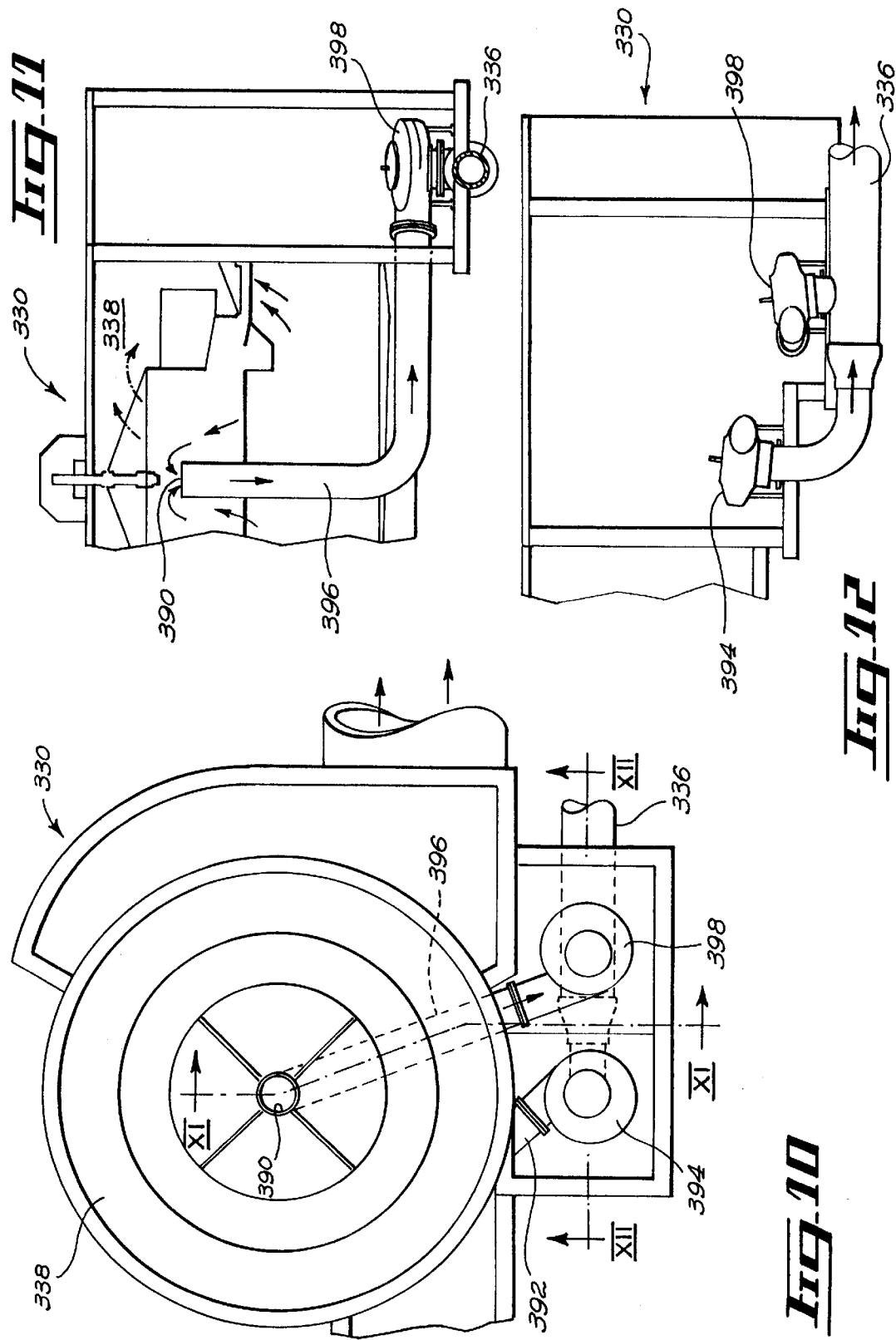

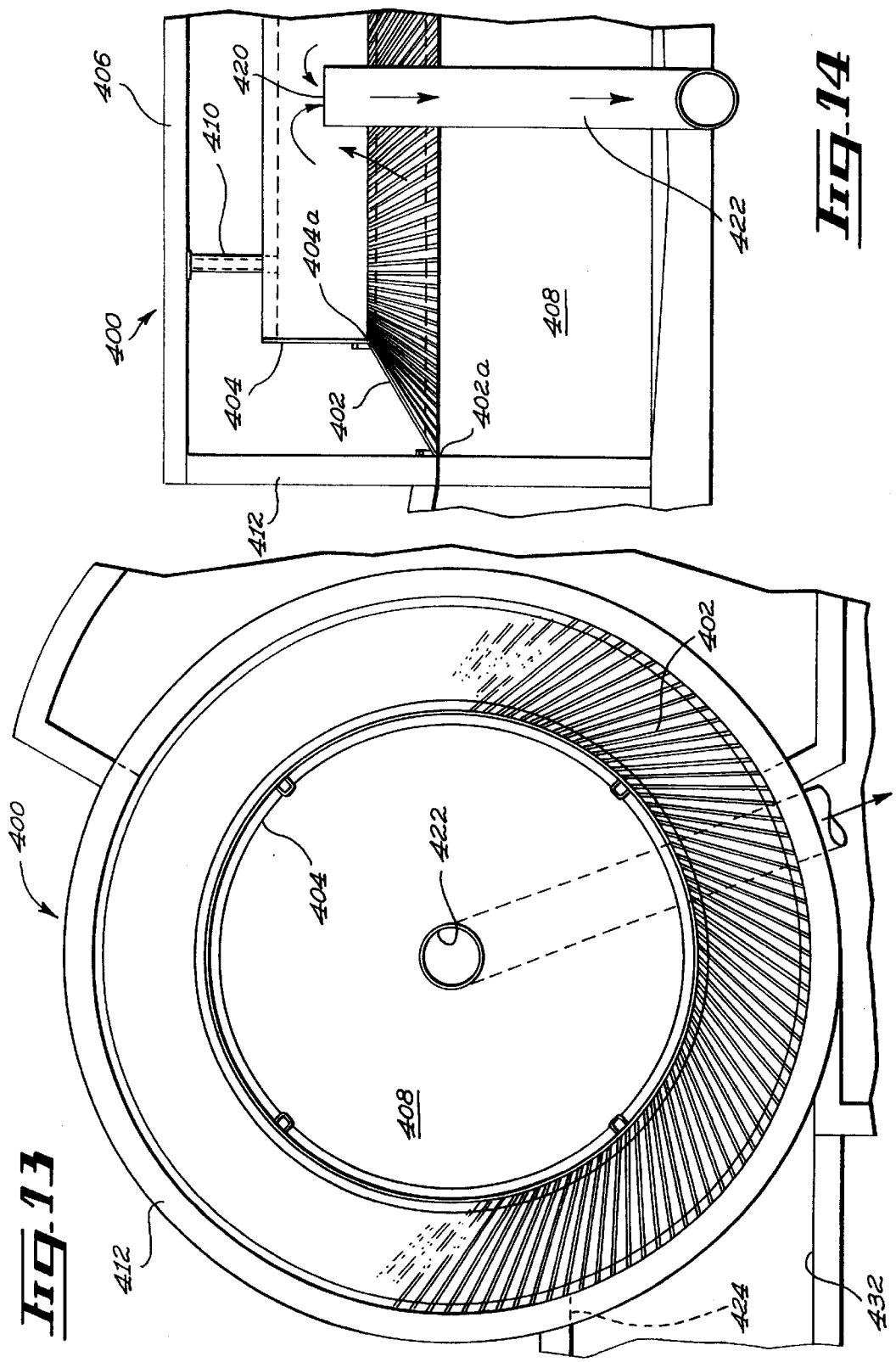

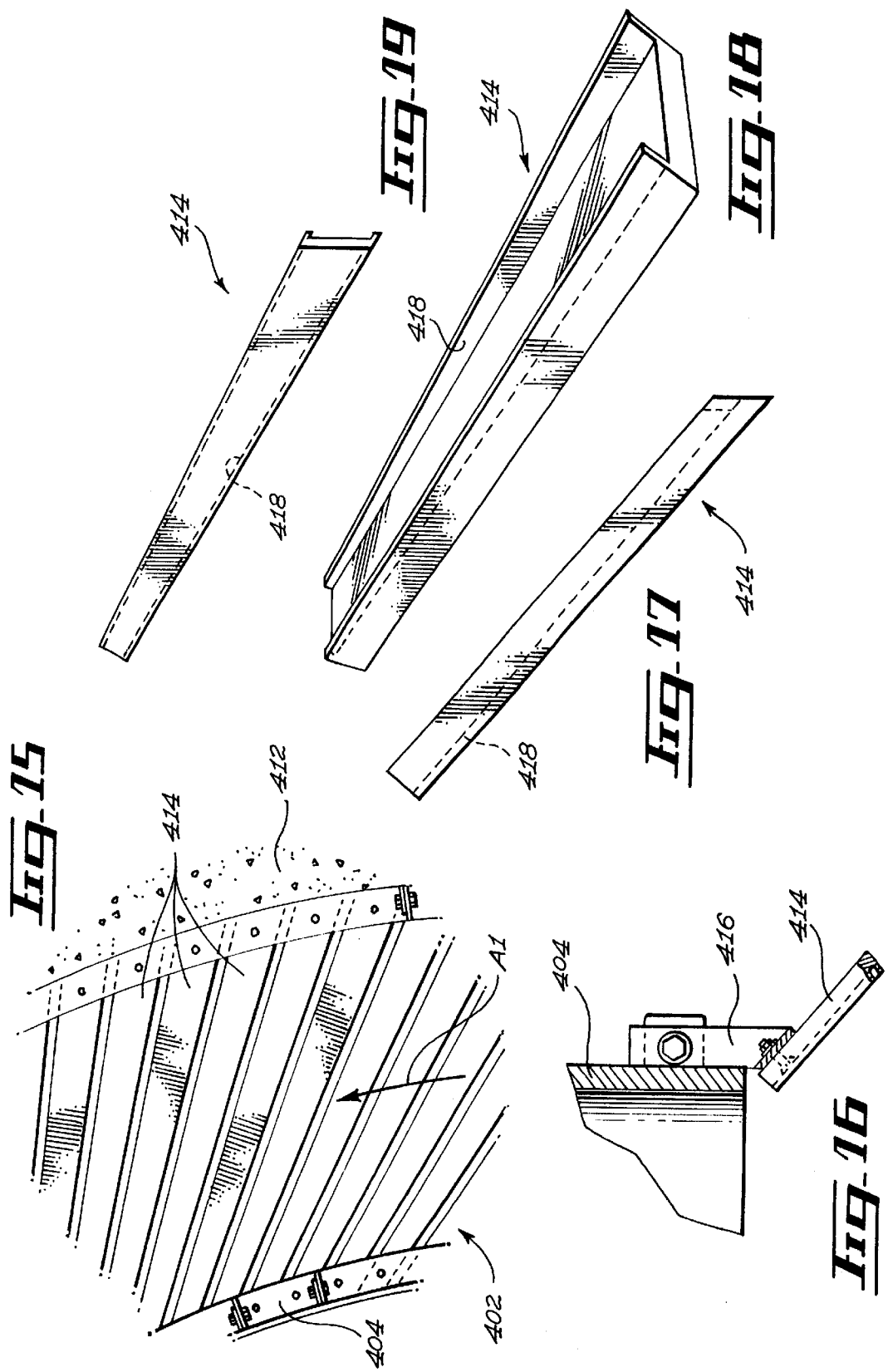

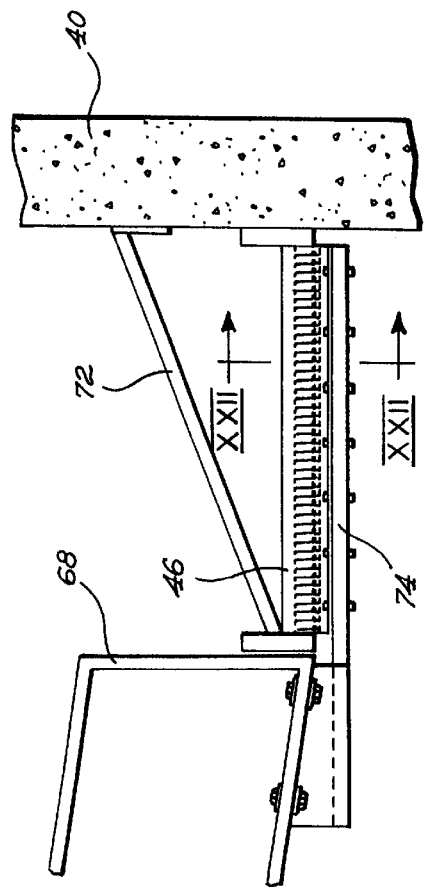
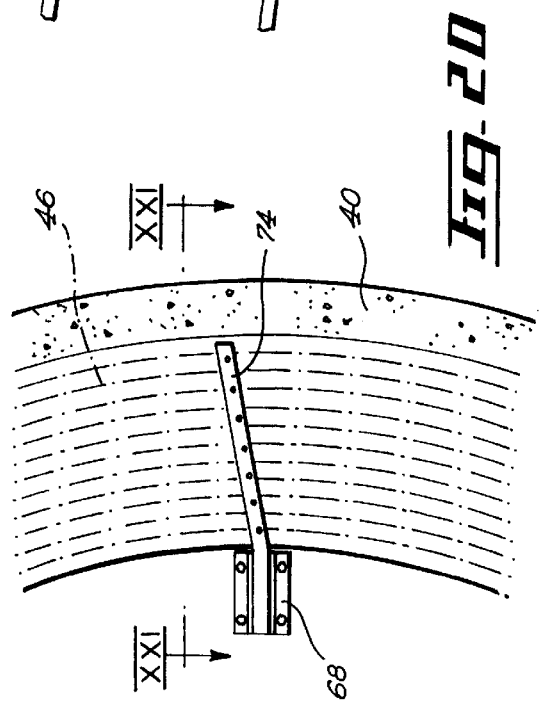
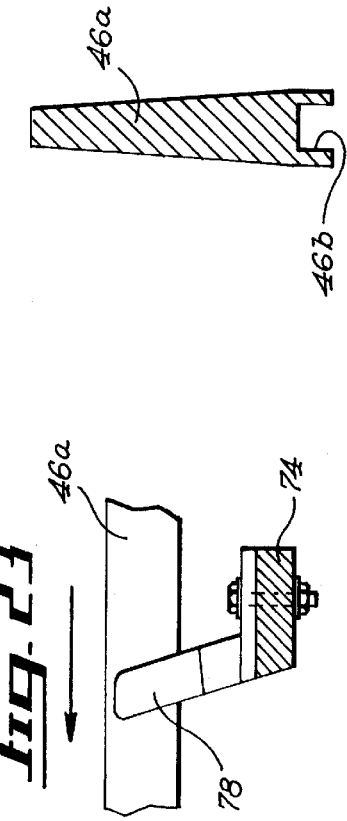
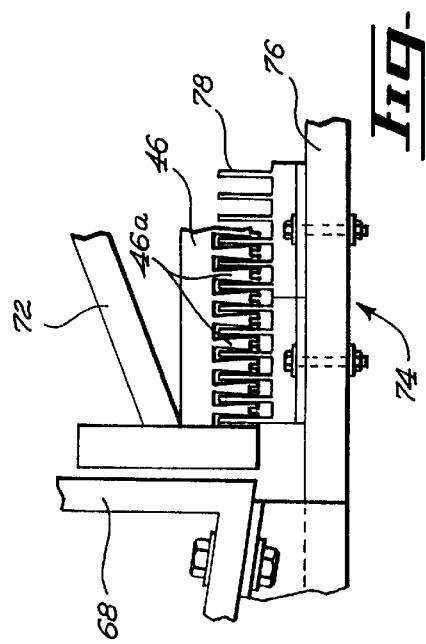

WASTE WATER CONTAMINANT SEGREGATING UNIT FOR SEWER CONDUITS

FIELD OF THE INVENTION

The present invention relates to a screening apparatus for large output waste water, and more particularly to a screening apparatus for screening overflow water during important water flow rate conditions in ducts or the like.

BACKGROUND OF THE INVENTION

Waste water separators are used to filter out macroparticles from the waste water pouring in city sewer ducts or the like. The purpose of these separators is that all the waste water be disposed of to a waste water treatment plant during dry times, but to provide water screening during water overflow times, e.g. during rain showers or the like. Indeed, since conventional water treatment plants cannot receive and treat very large flow rates, such as the ones that usually result from rain storms, most cities have adopted regulations that provide for 100% waste water treatment during "dry times" and up to a certain threshold water flow rate during moderately rainy weather, over which the excess waste water is allowed to be sent back into the environment, though after being screened. During very important rain storms, the excess waste water which cannot be screened is allowed to be sent back into the environment unscreened.

The screened excess waste water is what causes problems, during important rain falls. Indeed, the devices that have been provided to screen out the waste water in the prior art have a tendency to clog up or to have a poor efficiency/cost ratio; moreover, these water screening devices require regular maintenance from mechanized equipment, at a high cost. For these reasons, vortex-type separators have been invented, to help automatically separate the macroparticles from the water so as to convey them towards the water treatment plant with the water to be treated.

The prior art devices that use vortex-type separators have very large basins to collect overflow water, and therefore capital costs are very high and require large installation footprint. Moreover, these known devices lack any screening grate to screen the water-borne macroparticles. Also, these devices are often limited to collecting floating macroparticles, and not those that were in suspension in the water which are allowed to be conveyed back into the environment, even during weather resulting in only intermediate water flow rates inside the waste water ducts.

Other prior devices used power means, such as an electric motor, to create the vortex, and therefor also had high operation costs.

OBJECTS OF THE INVENTION

It is an object of the present invention to provide a screening apparatus for large output waste water in ducts or the like that will allow the waste water to be entirely dispatched to a water treatment plant during dry times, and that will screen the overflow waste water during important storm water flow rate conditions before release to the biota.

It is another object of this invention that the screening apparatus be self-cleaning.

It is yet another object of the present invention that the screening apparatus have a low production cost.

SUMMARY OF THE INVENTION

The present invention relates to a waste water macroparticulate contaminant segregating unit for use in a sewer conduit, said segregating unit defining a main upright water chamber having:

(a) a high-output waste water inlet port, located at a lower portion of said upright chamber for fluid connection with an upstream waste water inlet pipe of the sewer conduit;

b) a first low-output outlet port, located at a bottom portion of said upright chamber for fluid connection with a first outlet pipe leading to a waste water treatment plant;

c) a second outlet means, located at an upper portion of said upright chamber and generally above the level of said inlet port, for fluid connection of water with a second outlet pipe leading to a downstream section of the sewer conduit network;

d) a stationary screen member, fixedly mounted into said main chamber intermediate said inlet port and said second outlet means, for allowing therethrough water while intercepting macroparticulate contaminants under stormwater flow conditions; wherein said screen member becomes operational under stormwater conditions with the waste water inside said upright chamber rising under overflowing water conditions of said first low-output outlet port being overloaded by the stormwaters; and e) unpowered means for continuously self-cleaning the screen member from the intercepted macroparticulate contaminants under hydrodynamic forces whereby intercepted macroparticulate contaminants return to said first outlet port;

wherein due to the shape of said main chamber and the relative orientation of said inlet port, vortex water currents are generated beneath said screen member, said vortex currents promoting selective migration of the macroparticulate contaminants toward said low-output first outlet port;

wherein due to the shape defined by said main chamber and the relative orientation of said inlet port, vortex water currents are generated beneath said screen member, said vortex water currents promoting macroparticulate contaminant migration toward said low-output first outlet port.

Preferably, said screen member includes a main panel with a central aperture; and said segregating unit further includes:

a shaft member, rotatably mounted vertically to and supported by a top portion of said main chamber, a rotor assembly fixedly hung to said shaft for rotation therewith, and defining a vertically extending cylindrical main body open at both top and bottom ends and axially engaged by said shaft member;

a number of rotor blades downwardly depending from said rotor assembly and adapted to rotate said rotor assembly around said shaft member reactively under stormwater flow forces from the water escaping from said inlet port and overflowing from said first outlet port, said rotor assembly and rotor blades being mounted to said screen member within said central aperture; and a brush member mounted to said rotor assembly and frictionally engaging said screen member whereby intercepted macroparticulate contaminants are continuously dislodged from the stationary said screen member by said rotating brush member during stormwater conditions.

Advantageously, the segregating unit further includes a buoyancy member, fixedly carried by said rotor assembly adjacent said rotor blades, wherein rotation of said rotor member under hydrodynamic forces is facilitated once rising water levels inside said upright chamber reaches said buoyancy member and provides at least partial buoyancy to said rotor member during stormwater conditions.

Advantageously, the segregating unit further includes an elongated endless screw member, downwardly depending from and coaxially mounted to said shaft member, wherein said screw member defines a top waste water intake end located above the level of said screen member and a bottom end below the level of said screen member and in closely spaced overlying register with said first outlet port for forcibly conveying top floating debris downwardly to the waste water treatment plant outlet pipe during stormwater conditions.

Advantageously, the segregating unit further includes an elongated tube member extending vertically through said rotor member main body and having a top waste water inlet mouth, at a level above said screen member and merging at its bottom end with said first outlet port.

Preferably, said main upright chamber is cylindrical; and said screen member further includes an annular section carried at the peripheral section of said main panel and consisting of a plurality of transverse elongated grate bars, each successive pair of grate bars being spaced by a spacing gap for upward water flow-through, each said spacing gap being small enough to screen macroparticulate contaminants;
said grate bars being generally radially oriented but with a slight tangential offset; said screen annular section being downwardly radially outwardly inclined.

Preferably, each said elongated bar includes a lengthwise groove on its underface.

Advantageously, said lengthwise groove is of increasing cross-section in a radially outward direction of the screen annular section.

Preferably, said screen annular grate section has a radially outward inclination relative to the horizontal plane ranging between 30° to 45°.

DESCRIPTION OF THE DRAWINGS

In the annexed drawings:

FIG. 3 is similar to FIG. 2, but further suggests the water level and flow direction inside the apparatus during light rainwater conditions;

FIG. 4 is similar to FIG. 3, but with the water level being suggested during important storm water flow rate conditions;

FIG. 5 is similar to FIG. 1, but shows a second embodiment of the invention;

FIG. 6 is a side cross-sectional view taken along line VI—VI of FIG. 5;

FIG. 7 is a top plan view of a third embodiment of the invention;

FIGS. 8 and 9 are cross-sectional views taken along lines VIII—VIII and IX—IX respectively, in FIG. 7;

FIG. 10 is a top plan view of a fourth embodiment of the invention;

FIGS. 11 and 12 are cross-sectional views taken along lines XI—XI and XII—XII respectively, in FIG. 10;

FIG. 13 is a top plan view, at an enlarged scale, of the apparatus of a fifth embodiment of the invention, showing more particularly the rotor grate thereof;

FIG. 14 is a fragmentary elevation of the apparatus of FIG. 13, also showing more particularly the rotor grate;

FIG. 15 is a top plan view, at an enlarged scale, of the grate bars of the apparatus;

FIG. 16 is a side elevation of a bracket member showing how the annular grate is held to the rotor;

FIGS. 17, 18 and 19 are respectively a side elevation, a perspective view and a top plan view of a bar of the grate of FIG. 15;

FIG. 20 is a bottom plan view of part of the grate according to either one of the first four embodiments of the invention, suggesting the grate bars in shadowed lines, with a cleaning comb member thereon;

FIG. 21 is an enlarged cross-sectional view taken along line XXI—XXI of FIG. 20;

FIG. 22 is a cross-sectional view, at a still enlarged scale, taken along line XXII—XXII of FIG. 21;

FIG. 23 is a side cross-section, at a still enlarged scale, of the comb member cleaning the bars from FIG. 22, showing more particularly one finger of the comb member; and FIG. 24 is a cross-sectional view, at an enlarged scale, of a preferred configuration of one grate bar.

DETAILED DESCRIPTION OF THE PREFERRED EMBODIMENTS

Figure 1:
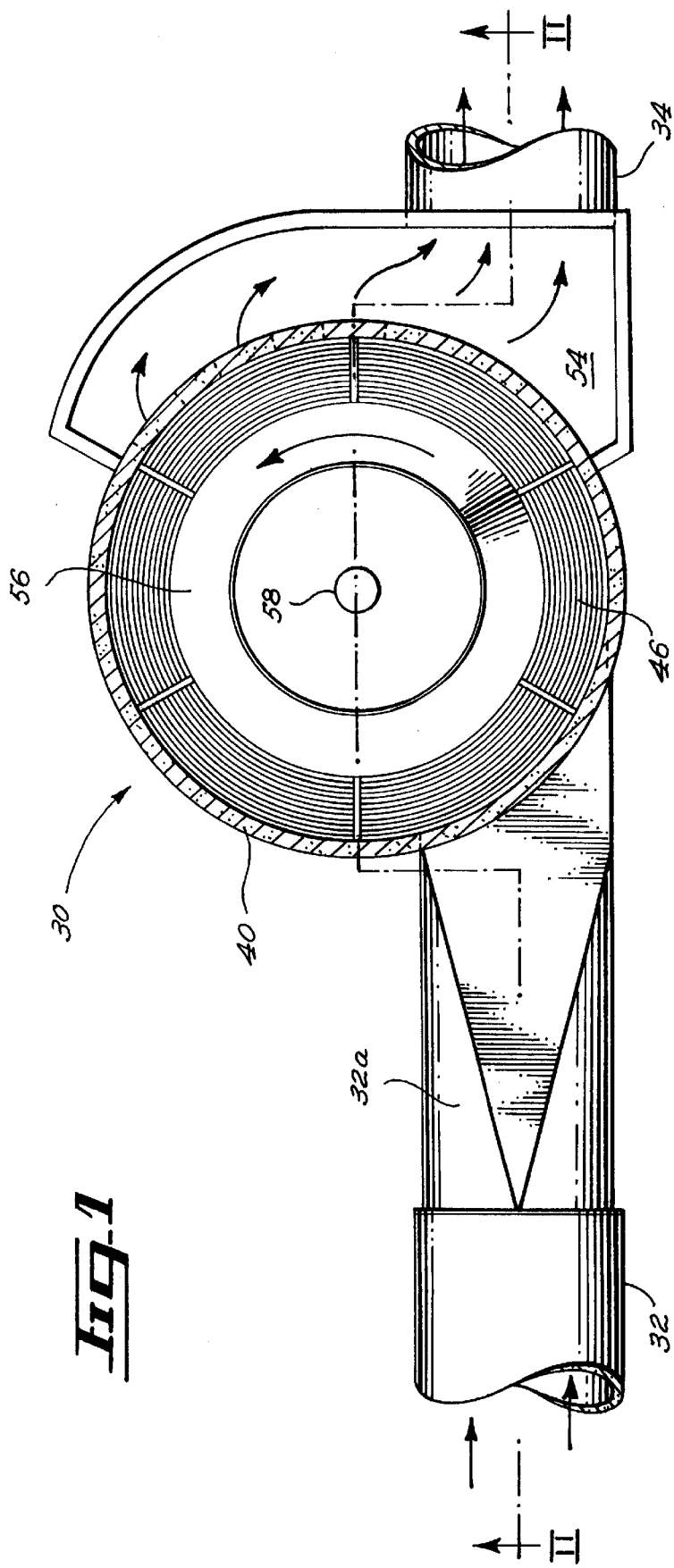
FIG. 1 is a top plan view, partly in cross-section, of the screening apparatus according to a first embodiment of the invention.

FIGS. 1 to 4 show a first embodiment of the screening apparatus 30 according to the invention.

The screening apparatus or waste water macroparticulate contaminant segregating unit 30 is fluidingly connected to and serially installed between a waste water pipe 32, an outlet pipe 34 (beyond a grate) and a ground refuse pipe 36. Its purpose is to convey most of the waste water issuing e.g. from underground city sewer ducts from the waste water pipe 32 to the refuse pipe 36. "Most of" the waste water means that in dry times, i.e. non-rainy weather or light rain (the waste water pipe is rarely—and often never—really dry), all the waste water is destined to be conveyed into the refuse pipe 36, to be carried to a water treatment plant. However, during weather that results in rather important water flow rates inside waste water pipe 32, hereafter called an important water flow rate, it is accepted that the excess water above a selected rate be dispatched into the environment, without being treated at the water treatment plant previously. Thus, outlet pipe 34 is only in use when the water flow rate is relatively important, as will be explained hereafter.

Figure 2:
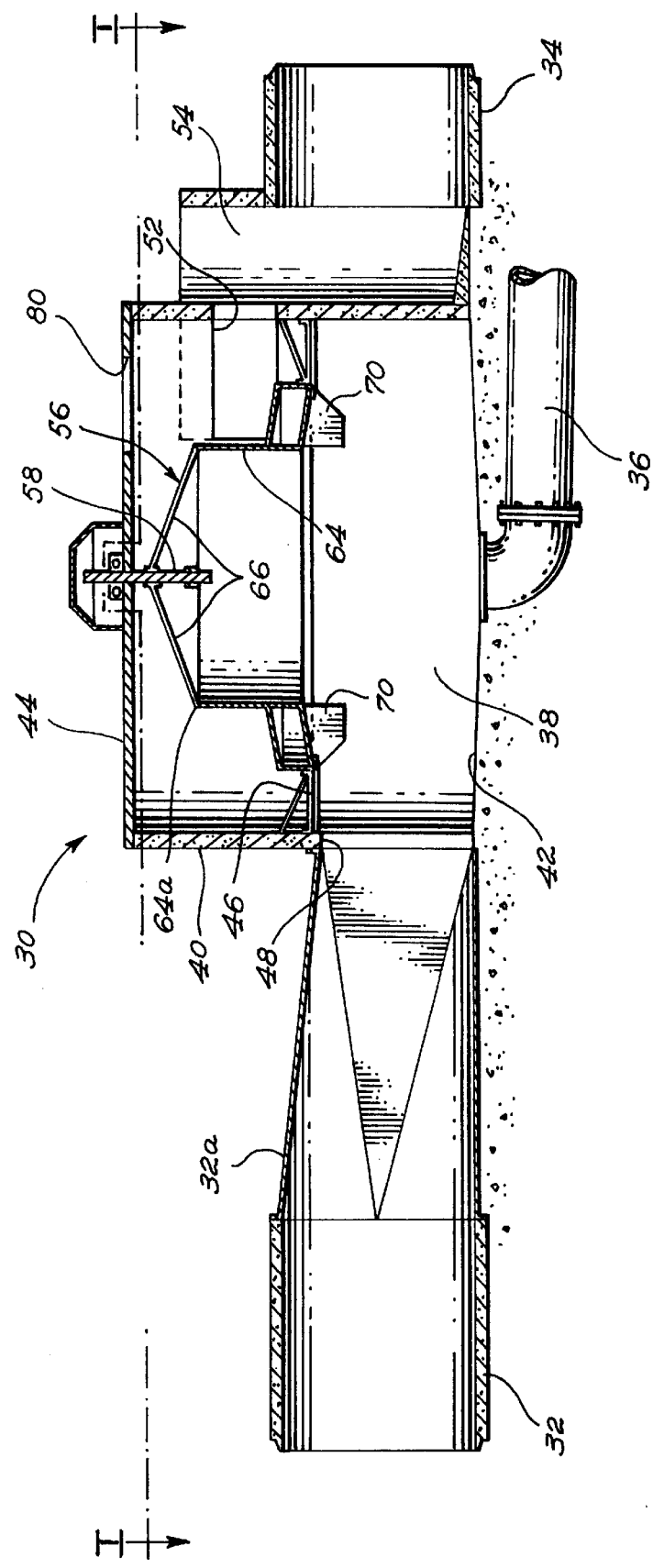
FIG. 2 is a sectional elevation of the screening apparatus taken along line II—II of FIG. 1.

Waste water pipe 32 has a slightly downwardly oriented top wall at its section 32a near screening apparatus 30, as suggested in FIGS. 2, 3 and 4. Moreover, the outer walls of end section 32a gradually become flat, to form a rectangular inlet opening 48.

Screening apparatus 30 comprises a main collecting chamber 38 having a cylindrical upright wall 40, a flooring 42 and a top wall 44. An annular grate 46 is coaxially installed in chamber 38 in overhanging fashion, fixedly attached to peripheral wall 44 at a selected height above flooring 42 thus defining an upper portion over grate 46 and a lower portion under grate 46 in main chamber 38. The bars of grate 46 are annular according to this first embodiment of the invention. An inlet opening 48 is located on peripheral wall 40 in the main chamber 38 lower portion, thus entirely under—and extending short of—grate 46, inlet opening 48 fluidingly linking main chamber 38 to waste water pipe 32. Inlet opening 48 is also positioned eccentrically relative to cylindrical main chamber 38, as shown in top plan view, as illustrated in FIG. 1. Indeed, it is positioned so that waste water inlet pipe 32 extend tangentially inwardly relative to the inner surface of main chamber 38.

A refuse outlet opening 50 located at the center of flooring 42 allows the waste water entering main chamber 38 to exit therethrough directly into refuse pipe 36, towards the water treatment plant (not shown). Preferably, as shown in the drawings, the flooring 42 is slightly conical, so as to slope downwards towards refuse outlet opening 50. Outlet part 50 should be located at or below the lowest level of inlet opening 48 of waste water pipe 32, to prevent water ponds inside chamber 38 during dry spells.

A number (e.g. three as shown in the drawings) of overflow outlet openings 52 are located on peripheral wall 40 in the main chamber 38 upper portion, thus entirely above the level of grate 46, to fluidingly connect, by means of an outlet chamber 54, main chamber 38 to outlet pipe 34.

A main cylinder or rotor member 56 pivotally hangs from top wall 44 by means of a vertical shaft 58 which projects upwardly through and beyond top wall 44. An annular bearing mount 60 is fixedly attached on top wall 44 and shaft 58 is rotatably journalled thereto. Bearing assembly 60 allows rotation of the vertical shaft 58 and rotor member 56 assembly; however, due to high weight of heavy rotor member 56, considerable rotational forces need to be expended for countering inertial forces before the rotor 56 can effectively be brought into rotation. Rotor member 56 is coaxially installed in main chamber 38 and diametrally extends out to grate 46, without quite touching it or slightly brushing it.

Rotor member 56 comprises a vertical cylindrical wall 64 which defines a central interior through channel and which is fixedly secured to shaft 58 by means of several struts or holding bars 66, that are peripherally fixed on the upper edge of cylindrical wall 64 and which radially and upwardly extend to vertical pivotal shaft 58. An annular buoyancy member 68 is fixedly attached to the radially outer surface of peripheral wall 64 at its lower edge portion. Buoyancy member 68 could alternately comprise a number of separate buoyant elements equally spaced on the lower radially outward periphery of rotor member 56. Several hydrofin blades 70 vertically depend from the underface of buoyancy member 68 at regular intervals along the periphery thereof.

FIGS. 1, 2, 3 and 21 show that several, e.g. six, cross-bars 72 help support the otherwise horizontal grate 46 spacedly over the level of water inlet 48, by being attached at its inner periphery and upwardly and radially extending out to peripheral wall 40. It is also envisioned that grate 46 could be inclined at an angle θ such that 0°≦θ≦ 90° relative to a horizontal plane, though it must always be either horizontal, almost vertical or radially and downwardly oriented towards peripheral wall 40. In the case of a vertical grate 46 or one that has a very large obtuse angle, it would be necessary to provide a wall extension (not shown in the drawings) linking the peripheral wall to the grate lower edge, since the grate upper edge is in any case adjacent the rotor 56 bottom edge and the macroparticles must not be allowed to rise above grate 402 without being screened.

FIGS. 20 to 23 show that a cleaning comb member 74 is fixedly attached, e.g. bolted, to the underface of buoyancy member 68. There can be more than one such comb member 74, each of them being located at regular circumferential intervals if such is the case. Each comb member 74 has an elongated radially and outwardly extending main body 76 supporting a number of equally spaced and upwardly projecting fingers 78 (FIGS. 22 and 23), each finger 78 extending through the gap between two successive bars 46a of grate 46. Comb member main body 76 spacedly underlies grate 46 parallel thereto but extending transversely thereto, so that comb member 74 is horizontal in the case of horizontal grate 46 (as shown in the drawings), and comb member 74 is inclined in an alternate embodiment where grate 46 would be inclined (not shown in the drawings).

In use, as shown in FIG. 3, during dry times, the water flowing into screening apparatus 30 from waste water pipe 32 is completely dispatched through refuse pipe 36 via floor outlet port 50. However, during storm water flow conditions inside waste water pipe 32, backflow water from overloaded refuse pipe 36 brings the water level inside main chamber 38 to rise, since the incoming flow rate of diametrally larger waste water pipe 32 is greater than that allowed to flow out of diametrally smaller refuse pipe 36. The diameter of refuse pipe 36 is selected to allow a predetermined maximum flow rate which the water treatment plant can accommodate, considering that many such refuse pipes feed the remotely located water treatment plant. During those dry time conditions, rotor member 56 simply hangs stationary from top wall 44 by resting on bearing 60.

The water tangentially entering main chamber 38 from waste water inlet pipe 32 will hit the cylindrical peripheral wall 40 of main chamber 38, to be projected into a circular motion. Thus, a vortex is formed coaxially inside main chamber 38 relative to bottom outlet port 50. One of the known advantages of having a vortex is that it helps prevent backwashing of the water inside refuse pipe 36, the water instead flowing in a substantially regular fashion.

During storm water conditions, when the water level rises enough to reach buoyancy member 68, hydrostatic forces will assist in partly relieving weight loadings of rotor member 56 about bearing mount 60 onto top wall 44, so as to substantially reduce frictional forces preventing free rotor rotation about bearings 60. The water flow itself from the vortex generated by storm water from pipe 32 will engage the downwardly projecting blades 70 of rotor 56, so as to bring into a rotational movement the rotor 56 under hydrodynamic forces. At this point, and for the purpose of this application, when the water reaches this threshold value where the rotor 56 temporarily "floats" in the back flow water volume inside chamber 38 generated by overflowing refuse pipe 36, it is considered that it is not dry time conditions anymore, but important storm water flow rate conditions.

With water overflow still in progress, the water is allowed to rise above the level of grate 46 by flowing through the radial gaps of its bars, and also to rise radially inside the through channel defined by rotor cylindrical wall 64, though in the latter case it cannot escape until it reaches the upper edge of cylindrical wall 64. The water rising above grate 46 will effectively be screened of any macroparticles floating therein, since these macroparticulate contaminants will be prevented from passing through the grate bars 46a. When the water level reaches overflow outlet openings 52, as shown in FIG. 4, it can flow out through them and fall into outlet pipe 34 and conveyed back into the environment through outlet pipe 34, having been screened. Of course, it is understood that the water continues during this whole process to flow out through refuse pipe 36, and that it is only the water overflowing refuse pipe 36 that will rise in main chamber 38 to flow out of overflow outlet openings 52.

Thus, during important storm water flow rate conditions, the water overflowing refuse pipe 36 will be allowed back into the environment, though it will have been screened of many macroparticles before doing so.

An advantage of having the water flow forming a vortex is that the macroparticles floating at the surface of the body of water are more likely to eventually get caught in the downwardly oriented water flow created at the center of the vortex, to be dispatched out through bottom refuse pipe 36.

The purpose of rotor member 56 is to rotate the cleaning combs 74 along grate 46, to dislodge any macroparticles clogging grate 46 by getting stuck between two or more grate bars 46a, wherein these macroparticles fall down to flooring 42. The water flow being the hydrodynamic power means by which rotor 56 will rotate to carry the cleaning comb members 74, it can be said of this screening apparatus 30 that it is self-cleaning. Indeed, no external power means are necessary, and the likelihood of macroparticles clogging grate 46 is greatly reduced.

FIG. 23 shows that the upwardly extending comb fingers 78 are frontwardly inclined, so that any macroparticle abutting thereon will slide along fingers 78 to be downwardly projected to clear the grate 46.

FIG. 24 shows a cross-section of a preferred embodiment of the grate bars 46a, with a longitudinal groove 46b on their edgewise underface. This known construction allows the water to flow in groove 46b and effectively help prevent the floating debris from sticking to the underface of grate 46.

Of course, clogging of grate 46 is not impossible, especially if there are very large debris carried by the water flow, and therefore an access port manhole 80 (FIG. 2) is located on top wall 44 to allow controlled entrance to a maintenance crew into screening apparatus 30.

If the water flow rate becomes extremely important, e.g. in very heavy and long thunderstorm conditions, the water level will rise even higher in main chamber 38, and that it will overflow over the top edge 64a of rotor cylindrical wall 64. In this situation, the water overflowing the cylindrical wall upper edge 64a will be allowed out through overflow outlets 52 and into the environment without being screened. It is understood, however, that these extremely important water flow rates occur very rarely, and that they are tolerated by city regulations as exceptional measures that are to be applied only during exceptional weather conditions. Indeed, when these exceptional conditions do occur, it is important that the screening apparatus let the water out, to prevent water from backwashing back through waste water inlet pipe 32 and upstreamly flooding the area which it is supposed to drain.

Any macroparticles that have a tendency to sink in the water will of course be carried by the vortex into refuse pipe 36, with the sloping flooring 42 helping to further this end.

Thus, the water flow rate can be in one of three states:

1) small enough that the whole water flow can be entirely dispatched through refuse outlet pipe 36 ("dry time conditions"—see FIG. 3);
2) important, so that refuse outlet pipe 36 will not suffice in dispatching the whole water flow and will overflow, and the water level will rise inside chamber 38 until it reaches overflow outlets 52 ("important water flow rate conditions"—see FIG. 4); at this point, the water flow rate can increase of a rather important value without this situation changing in any way, due to the combined capacity of overflow outlets 52 together with refuse outlet pipe 36; and
3) extremely important, at which point the water level rises above the upper edge 64a of rotor member cylindrical wall 64 and thus overflows into the environment partly without being screened (as suggested by arrow 65 in FIG. 4).

FIGS. 5 and 6 show a second embodiment of a screening apparatus 130 according to the invention. The cylindrical main chamber 138 of this second embodiment is identical to main chamber 38 of the first embodiment, thus allowing a vortex to form therein. However, under rotor member 156 is located a large, vertical and large-pitched endless screw 182 which is coaxially installed in main chamber 138 in a cylindrical complementary sleeve 184, integrally attached coextensively to the bottom end of overlying shaft 158. Sleeve 184 rests on a quadripod 186 so as to have its bottom edge spaced from main chamber flooring 142, though it vertically registers with flooring outlet port 150. Also, endless screw 182 is longer than sleeve 184, vertically extending upwardly beyond the upper edge 184a of sleeve 184; sleeve top edge 184a being located approximately at the upper level of buoyancy member 168.

In use, endless screw 182 will be entrained in rotation simultaneously with rotor member 156 under hydrodynamic forces to downwardly bias into sleeve 84 and towards refuse outlet opening 150 any floating macroparticles when the water level rises above the upper edge 184a of sleeve 184. Thus, endless screw 182 will only effectively operate during important water flow rate conditions when the rotor 156 "floats" in the overflowing water body. Due to the fact that the water flow forms a vortex inside main chamber 138, macroparticles are likely to be carried towards the center of the flow, and therefore be forcibly carried downwards by the vortex induced by rotation of the endless screw 182, even if these macroparticles have a tendency to float instead of sinking.

FIGS. 7 to 9 show a third embodiment of the invention.

The screening apparatus 230 according to this third embodiment is similar to that of the first embodiment 30, with a few changes. Cylindrical main chamber 238 still allows a vortex to be formed therein from incoming storm water flow, but this embodiment comprises two distinct refuse outlet openings, namely a lower refuse outlet opening 288, located about the lower portion of upright wall 240, and an upper refuse outlet opening 290, located above the level of buoyancy member 268.

Main chamber flooring 242 is not conical but rather slightly slopes downwards to a lowermost point on peripheral wall 240, near waste water inlet opening 248, where lower outlet opening 288 is located on peripheral wall 240. A short horizontal pipe 292 conveys the water exiting main chamber 238 through port 288 into a small, substantially cylindrical vortex chamber 294, from where it centrally exits vertically downwardly at its bottom wall via a branching pipe 235 into main refuse pipe 236 to be conveyed to the water treatment plant.

Short pipe 292 is oriented (FIG. 7) at an angle which is intermediate between a tangential orientation and a radial orientation, generally coextensively to waste water pipe 232 but with an elbow. The water flowing out from main chamber 238 will arrive in a substantially similar direction, due to the two speed vectors of the rotating water, i.e. a tangential and a radial speed vector. Short pipe 292 is connected to small vortex chamber 294 in a centrally offset fashion, so that the water flowing in will follow the peripheral wall to form a vortex therein also.

The purpose of small vortex chamber 294 is to increase water flow rates at pipe elbow sections before backwashing into short pipe 292 and back into main chamber 238 occurs.

Upper refuse outlet opening 290 opens up into an intermediate pipe 296 which is vertically and coaxially installed in main chamber 238. Pipe 296 extends downwardly through floor 242 and therebeneath, to then elbow before fluidingly connecting itself to horizontal main refuse pipe 236. Upper refuse float debris intake port 290 is located at a position which is higher than that of buoyancy member 268 and its purpose is to dispatch floating macroparticles to the water treatment plant.

The advantage of this third embodiment is that it more efficiently carries the water-borne macroparticles into the main refuse pipe 236 and to the treatment plant, since it can dispatch sinking macroparticles through lower refuse outlet opening 288 as well as floating macroparticles through upper refuse intake port 290. This is very desirable, since it is better for the water that is conveyed to the water treatment plant to carry the most macroparticles as is possible, to prevent same from being brought back into the environment or clogging the screen apparatus.

FIGS. 10 to 12 show a fourth embodiment of a screening apparatus 330 according to the invention.

Screening apparatus 330 is very similar to apparatus 230 of the third embodiment, with the only difference being that a second small, cylindrical, vortex chamber 398, similar to small vortex chamber 394 located at the extremity of short pipe 392, is eccentrically installed at the end of an intermediate pipe 396 which links upper refuse outlet opening 390 to main refuse pipe 336. The purpose of this small vortex chamber 398 of known construction is to help control the water flow from the intermediate pipe 396 to outlet pipe 336.

A fifth embodiment of a screening apparatus 400 according to the invention is shown in FIGS. 13 to 19.

Screening apparatus 400 is somewhat similar to the other embodiments described herein, e.g. the fourth embodiment. The difference between this embodiment and the other is in the shape of its grate 402 and in the fact that there is no "rotor"—the rotor assembly is anchored and fixed to the chamber main wall; and the "rotor" shall for this embodiment be called main cylinder 404; and there is therefore no need for a buoyancy member so that none is provided. Main cylinder 404 is indeed fixedly attached to the top wall 406 of main chamber 408 by stationary vertical shafts 410.

Grate 402 is upwardly conical, radially and downwardly depending from the bottom edge 404$a$ of main cylinder 404, and radially extends to reach at its lowest edge 402$a$ peripheral wall 412 of main chamber 408. The angle θ of grate 402, relative to a horizontal plane, can be anywhere within the range $0° \leq \theta \leq 90°$, though the preferred range is $30° \leq \theta \leq 45°$. It must never in any case be oriented radially outwardly and upwardly towards the peripheral wall 412, nor oriented radially inwardly and downwardly relative to the cylinder 404. The angle at which the best results can be expected is θ≈45°. Again, in the case of a vertical grate 402 or one that has a very large obtuse angle, it would be necessary to provide a wall extension (not shown in the drawings) linking the peripheral wall to the grate lower edge 402$a$, since the grate upper edge is in any case adjacent the bottom edge of main cylinder 404 and that the macroparticles must not be allowed to rise above grate 402 without fully extending therethrough so as to be screened.

The bars 414 of grate 402, as shown in FIGS. 13 to 15, originate at the bottom edge 404$a$ of cylinder 404 and extend radially away from main cylinder 404 towards peripheral wall 412 with a common upstream offset, the latter relative to the direction of the flow of water, as suggested by arrow Al in FIG. 15. That is to say, annular grate 402 defines a first quadrant registering with and positioned over inlet opening 424 (FIG. 13), a downstream direction being defined by the tangential direction which faces substantially away from inlet opening 424 in said grate first quadrant and an upstream direction being defined as the tangential direction opposite the downstream direction, with the bars 414 of grate 402 radially extending away from main cylinder 404 towards main chamber peripheral wall 412 with a common tangential upstream offset.

What is important is that, as suggested in the plan view of FIG. 13, the slightly offset radial orientation of the bars 414 along conical grate 402 be such that at least for a section of grate 402 at any given time, the radial gap between two successive bars 414 be generally coextensive axially (with an upward elbow) to the waste water pipe 432 from which storm water comes from, thus promoting self-cleaning of the grate under hydrodynamic forces.

FIG. 16 shows the link between one grate bar 414 and main cylinder 404: the grate bar is indeed fixedly attached by means of an annular bracket 416 to the outer periphery of main cylinder 404, at its bottom edge.

The reason for the particular orientation of the grate bars 414 is to allow self-cleaning without the rotatable rotor member equipped with comb members, as with the other embodiments. Indeed, the water from pipe 432 forming a vortex inside main chamber 408 will hit the grate bars 414 in such a way that any debris abutting thereon will be likely to be propelled by the water in an upward and inwardly radial fashion, therefore back into the vortex and away from the grate. This effectively helps prevent clogging of the grate by a hydrodynamic shearing effect of the water against the macroparticles on the grate bars.

Preferably, as shown in FIGS. 17 to 19, each grate bar 414 has a longitudinal groove 418 on its underface to help prevent debris from getting stuck against the bars 414, with groove 418 preferably being of decreasing thickness from peripheral wall 412 to main cylinder 404. The water will thus be allowed to flow in groove 418, possibly between the stuck debris and the bar, to help prevent clogging of grate 402.

It is understood that several embodiments of the invention have been shown in this application, though it is in no way restrictive. Indeed, any changes brought to one or another embodiment that remain within the scope of the present invention are included within the present invention.

Some of the alternate embodiments can be mixed together to form another embodiment of the invention, e.g. the inclined grate bar of the fifth embodiment could be used with either one of the refuse outlets proposed in the four previous embodiments. However, as shown in FIGS. 13 and 14, it is preferable to have an upper refuse outlet opening 420 opening into a vertical pipe 422 as with embodiments three and four, since the macroparticles propelled by the water against the grate bars 414 will be likely to be propelled towards the center of the vortex and in an upward direction, thus towards upper refuse outlet opening 420, where it is advantageous that these macroparticles be dispatched towards the water treatment plant.

It must be understood that the annular grate is essential to the invention, even if several refuse outlet port configurations have been proposed. Indeed, this particular position of the grate around the overflow through-channel formed inside the main cylinder, in combination with the positions of the inlet opening and overflow outlet opening relative to the grate, allows the overflow water body to be screened while it rises. It thus reaches the overflow outlet port screened of any macroparticles (unless in extreme storm water flow rate conditions, during which overflow occurs over the top edge of the main cylinder or rotor upper edge).

The desired refuse outlet opening configuration can be selected among the embodiments which have been proposed to best suit a particular situation. For example, if the water to be treated contains few or no floating macroparticles and only sinking macroparticles, then having an upper refuse outlet opening located in the central through channel of the cylinder or rotor is not necessary.

By macroparticulate contaminant in the waste water, we mean to say solid particles either in suspension or floating in the body of waste water inside the segregating unit main cylindrical chamber, with these solid particles having a size exceeding a certain threshold value. For example, the gap between two successive screen bars may be one millimeter (1 mm), and should be of a value of at least one mm and preferably of about 4 mm, so as to intercept all macroparticulate material of a size exceeding the corresponding dimensional threshold defined by the screen bars gap.

It is noted that the reference numerals are set in hundred series, namely, 100th, 200th, 300th, 400th series corresponding to given embodiments of the invention. Corresponding elements from previous embodiments maintain the same numbers, except for the hundred serie number being scaled up. Accordingly, we have deemed unnecessary to properly identify in the specification all higher hundred series reference numerals in the drawings, provided lower scale hundred series numerals for same elements had been properly identified.

I claim:

1. A screening apparatus to be serially mounted to a sewer conduit so as to be adapted to link a high-output waste water inlet pipe to a low-output refuse pipe and to an outlet pipe, the outlet pipe destined to become operational once the low-output refuse pipe overflows under storm water conditions, said screening apparatus comprising:

a) a main cylindrical chamber defining a flooring, a top wall and a cylindrical peripheral wall;

b) an annular grate coaxially located in said main chamber and fixedly attached to said peripheral wall at a position intermediate said flooring and said top wall, thus defining a lower portion under said grate and an upper portion over said grate in said main chamber, said grate being destined to screen rising water levels passing therethrough of any macroparticles contained in the water once the low-output refuse pipe is overloaded and water overflows under storm water conditions;

c) a main cylinder coaxially attached to said main chamber upper portion spacedly from said top wall; said main cylinder defining a cylindrical wall, a through channel therein, an upper edge facing said main chamber top wall and a lower edge opposite said upper edge, said annular grate being adjacent to and extending from said main cylinder lower edge radially outwardly to said main chamber peripheral wall;

d) an inlet opening, destined to be fluidingly connected to the waste water inlet pipe, said inlet opening being eccentrically located on said main chamber peripheral wall in said main chamber lower portion;

e) at least one first refuse outlet opening destined to be fluidingly connected to the refuse pipe, said first refuse outlet opening being located in said main chamber lower portion; and f) an overflow outlet opening located on said main chamber peripheral wall, in said main chamber upper portion, and destined to be fluidingly connected to said outlet pipe.

2. A screening apparatus as defined in claim 1, wherein said grate defines an underface oriented towards said main chamber lower portion, said main cylinder being rotatably attached to said main chamber top wall so as to allow axial rotation of said main cylinder, said main cylinder having a buoyancy member located at the bottom edge of said main cylinder, several blade members downwardly depending said lower edge of said main cylinder in said main chamber lower portion, and a number of broom members fixedly attached at said cylinder lower edge and radially outwardly extending towards said main chamber peripheral wall parallel and adjacent to said grate underface so as to frictionally engage it in a brushing fashion upon rotation of said main cylinder.

3. A screening apparatus as defined in claim 2, wherein said first refuse outlet opening is located in the center of said main chamber flooring and said flooring is slightly conical so as to downwardly slope towards said first refuse outlet opening.

4. A screening apparatus as defined in claim 2, further comprising an endless screw defining a lower and an upper end, said endless screw being coaxially located in said main chamber and integrally attached coextensively to said main cylinder, said endless screw lower end being spacedly located closely over said first refuse outlet opening in said main chamber lower portion and upwardly extending in said main cylinder through channel and thus in said main chamber upper portion, said screening apparatus further comprising a sleeve fixedly installed in said main chamber and conformingly and coaxially installed around said endless screw but extending short of said endless screw upper end.

5. A screening apparatus as defined in claim 1, further comprising a small substantially cylindrical vortex chamber having a substantially cylindrical peripheral wall, a bottom wall with an outlet and an upper wall, said small cylindrical vortex chamber fluidingly interconnecting in elbowed fashion said first refuse outlet opening and said bottom wall outlet.

6. A screening apparatus as defined in claim 1, further comprising a first and a second small substantially cylindrical vortex chambers each having a substantially cylindrical peripheral wall, a bottom wall with an outlet and an upper wall, said first refuse outlet opening and said intermediate pipe being fluidingly connected to said first and second small cylindrical vortex chambers, respectively, in an eccentric fashion on their said peripheral wall, said small cylindrical vortex chambers being in turn fluidingly connected to said refuse pipe by means of their respective said bottom wall outlets.

7. A screening apparatus as defined in claim 1, wherein said annular grate defines a first quadrant registering with and positioned over said inlet opening, a downstream direction being defined by the tangential direction which faces substantially away from said inlet opening in said grate first quadrant and an upstream direction being defined as the tangential direction opposite said downstream direction, said grate comprising a plurality of spaced-apart bars which radially extend away from said main cylinder towards said main chamber peripheral wall with a common tangential upstream offset.

8. A screening apparatus as defined in claim 1, wherein said grate is downwardly inclined from said main cylinder lower edge to said main chamber peripheral wall at an angle between 30° and 45° relative to a horizontal plane.

9. A screening apparatus as defined in claim 8, wherein said grate bars each define an underface oriented towards said main chamber lower portion, each said bar underface comprising a longitudinal groove.

10. A screening apparatus as defined in claim 9, wherein said grate bar grooves have a decreasing cross-section from said main chamber peripheral wall to said main cylinder.

11. A screening apparatus as defined in claim 8, further comprising a second refuse outlet opening located in said main cylinder through channel under said cylinder upper edge, said second refuse outlet opening being fluidingly connected to an intermediate pipe which is destined to be fluidingly connected to said refuse pipe; further comprising a first and a second small substantially cylindrical vortex chambers each having a substantially cylindrical peripheral wall, a bottom wall with an outlet and an upper wall, said first refuse outlet opening and said intermediate pipe being fluidingly connected to said first and second small cylindrical vortex chambers, respectively, in an eccentric fashion on their said peripheral wall, each said small cylindrical vortex chamber being in turn fluidingly connected to said refuse pipe by means of their respective said bottom wall outlet.

12. A waste water macroparticulate contaminant segregating unit for use in a sewer conduit, said segregating unit defining a main upright cylindrical water chamber having:

(a) a high-output waste water inlet port, located at a lower portion of said upright chamber for fluid connection with an upstream waste water inlet pipe of the sewer conduit;

b) a first low-output outlet port, located at a bottom portion of said upright chamber for fluid connection with a first outlet pipe leading to a waste water treatment plant;

c) a second outlet means, located at an upper portion of said upright chamber and generally above the level of said inlet port, for fluid connection of water with a second outlet pipe leading to a downstream section of the sewer conduit network;

d) a stationary screen member, fixedly mounted into said main chamber intermediate said inlet port and said second outlet means, for allowing therethrough water while intercepting macroparticulate contaminants under stormwater flow conditions;

wherein said screen member is annular and consisting of a plurality of transverse elongated grate bars, each successive pair of grate bars being spaced by a spacing gap for upward water flow-through, each said spacing gap being small enough to screen macroparticulate contaminants;

said grate bars being generally radially oriented but with a slight tangential offset; said screen annular section being downwardly radially outwardly inclined;

wherein said screen member becomes operational under stormwater conditions with the waste water inside said upright chamber rising under overflowing water conditions of said first low-output outlet port being overloaded by the stormwaters; and e) unpowered means for continuously self-cleaning the screen member from the intercepted macroparticulate contaminants under hydrodynamic forces whereby intercepted macroparticulate contaminants return to said first outlet port;

wherein due to the shape of said main chamber and the relative orientation of said inlet port, vortex water currents are generated beneath said screen member, said vortex currents promoting selective migration of the macroparticulate contaminants toward said low-output first outlet port.

13. A contaminant segregating unit as defined in claim 12, wherein said screen member comprises a central aperture; further comprising:

a shaft member, rotatably mounted vertically to and supported by a top portion of said main chamber, a rotor assembly fixedly hung to said shaft for rotation therewith, and defining a vertically extending cylindrical main body open at both top and bottom ends and axially engaged by said shaft member;

a number of rotor blades downwardly depending from said rotor assembly and adapted to rotate said rotor assembly around said shaft member reactively under stormwater flow forces from the water escaping from said inlet port and overflowing from said first outlet port, said rotor assembly and rotor blades being mounted to said screen member within said central aperture; and a brush member mounted to said rotor assembly and frictionally engaging said screen member whereby intercepted macroparticulate contaminants are continuously dislodged from the stationary said screen member by said rotating brush member during stormwater conditions.

14. A contaminant segregating unit as defined in claim 13, further comprising a buoyancy member, fixedly carried by said rotor assembly adjacent said rotor blades, wherein rotation of said rotor member under hydrodynamic forces is facilitated once rising water levels inside said upright chamber reaches said buoyancy member and provides at least partial buoyancy to said rotor member during stormwater conditions.

15. A contaminant segregating unit as defined in claim 13, further comprising an elongated endless screw member, downwardly depending from and coaxially mounted to said shaft member, wherein said screw member defines a top waste water intake end located above the level of said screen member and a bottom end below the level of said screen member and in closely spaced overlying register with said first outlet port for forcibly conveying top floating debris downwardly to the waste water treatment plant outlet pipe during stormwater conditions.

16. A contaminant segregating unit as defined in claim 13, further comprising an elongated tube member extending vertically through said rotor member main body and having a top waste water inlet mouth, at a level above said screen member and merging at its bottom end with said first outlet port.

17. A waste water macroparticulate contaminant segregating unit for use in a sewer conduit, said segregating unit defining a main upright cylindrical water chamber having:

(a) a high-output waste water inlet port, located at a lower portion of said upright chamber for fluid connection with an upstream waste water inlet pipe of the sewer conduit;

b) a first low-output outlet port, located at a bottom portion of said upright chamber for fluid connection with a first outlet pipe leading to a waste water treatment plant;

c) a second outlet means, located at an upper portion of said upright chamber and generally above the level of said inlet port, for fluid connection of water with a second outlet pipe leading to a downstream section of the sewer conduit network;

d) a stationary screen member, fixedly mounted into said main chamber intermediate said inlet port and said second outlet means, for allowing therethrough water while intercepting macroparticulate contaminants under stormwater flow conditions;

wherein said screen member is annular and consisting of a plurality of transverse elongated grate bars, each successive pair of grate bars being spaced by a spacing gap for upward water flow-through, each said spacing gap being small enough to screen macroparticulate contaminants;

said grate bars being generally radially oriented but with a slight tangential offset; said screen annular section being downwardly radially outwardly inclined;

wherein said screen member becomes operational under stormwater conditions with the waste water inside said upright chamber rising under overflowing water conditions of said first low-output outlet port being overloaded by the stormwaters;

wherein due to the shape of said main chamber and the relative orientation of said inlet port, vortex water currents are generated beneath said screen member, said vortex currents promoting selective migration of the macroparticulate contaminants toward said low-output first outlet port and self-cleaning of said screen member.

18. A contaminant segregating unit as defined in claim 12, wherein each said elongated bar includes a lengthwise groove on its underface.

19. A contaminant segregating unit as defined in claim 18, wherein said lengthwise groove is of increasing cross-section in a radially outward direction of the screen annular section.

20. A contaminant segregating unit as defined in claim 12, wherein said screen annular grate section has a radially outward inclination relative to the horizontal plane ranging between 30° to 45°.

\* \* \* \* \*